March 6, 1962 W. SCHWAB 3,023,540
FLY SWATTERS
Filed Jan. 25, 1961
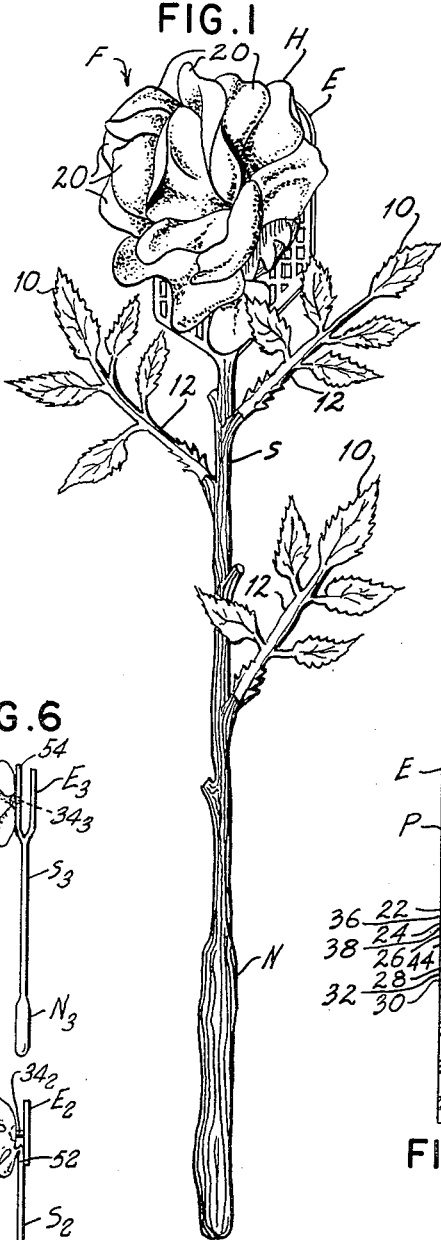
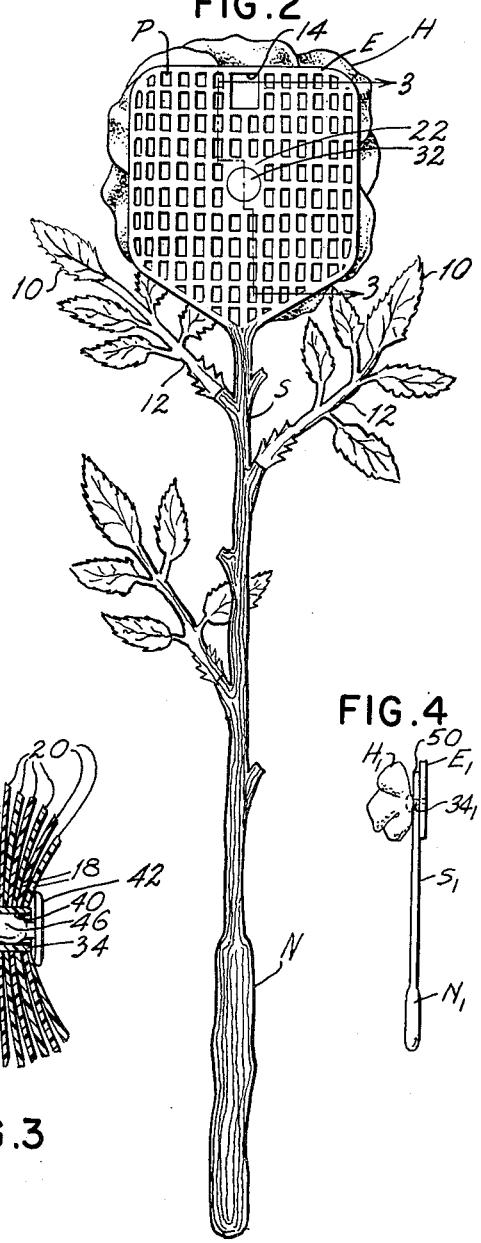
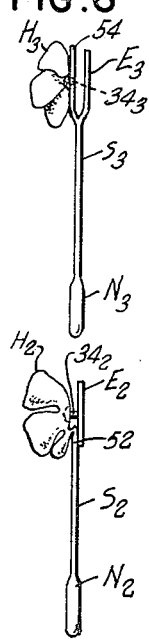
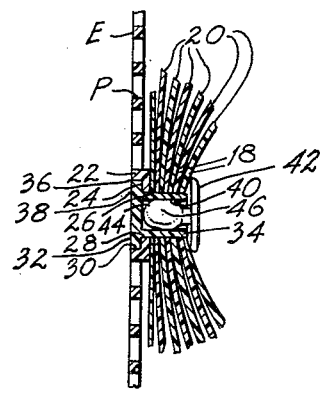
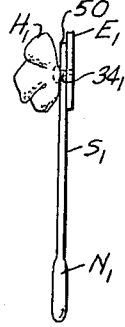

United States Patent Office 3,023,540
Patented Mar. 6, 1962

3,023,540
FLY SWATTERS
William Schwab, New York, N.Y., assignor to Schwab
& Udell, Inc., Brooklyn, N.Y., a corporation of New York
Filed Jan. 25, 1961, Ser. No. 84,790
6 Claims. (Cl. 43—137)

This invention relates to fly swatters and particularly to fly swatters which incorporate a decorative structure rendering their generally unsightly appearance more pleasant, or completely obscuring their swatter-like character.

A fly swatter is generally constructed of a thin, flexible, perforated swatter element for contacting and crushing a fly or other insect and a more rigid elongated handled stem supporting the swatter element and providing an extension to the user's reach. The user of the swatter may grasp the handle at the end of the stem and reach out to strike an undesirable insect with the swatter element, the perforations providing air passages to prevent air disturbances in the vicinity of the target which disturbances would otherwise frighten away the intended victim.

Fly swatters are, however, generally considered unsightly and frequently are hidden from view in inaccessible places, making use thereof difficult.

It is an object of this invention to provide a fly swatter which is endowed with a decorative and pleasing appearance.

It is also an object of my invention to impart to a generally decorative structure the useful character of a fly swatter while at the same time utilizing the shape and characteristics of the decorative structure for fly-swatter action.

To these ends and in accordance with a feature of my invention, I utilize the elongated portion of a decorative structure having such an elongated portion and terminating in an enlarged portion, as the stem of a fly swatter, and support therewith a swatter element. The swatter element is, in turn, hidden behind the enlarged portion.

The swatter may be hung on a vertical surface by way of a projection-receiving enlarged perforation in the swatter element. When so hung substantially only the decorative structure remains visible, and yet the swatter is immediately usable for its intended purpose.

Preferably the decorative structure of my invention is comprised of an artificial representation of a flower or a fruit such as an apple (or half an apple) having a leaved stem made, for example, of flexible plastic such as polyethylene and reinforced with interior metal wires where necessary. The plastic representing the flower petals may be collectively larger than the swatter element thereby covering the entire surface therefrom when viewed from a forward angle. The invention contemplates representation of other stemmed fruits such as grapes, oranges etc. either as a whole or cut in half.

In a preferred embodiment of the features of the invention, the leaved flower stem supports at one end the perforated swatter element, the plastic representing the flower petals being secured to the center of the swatter element and extending radially to substantially hide the swatter element.

The decorative stem may, however, directly support the flower petals as well as the swatter element, or may support the flower petals alone while the petals hold the swatter element.

For a better understanding of the invention, its other objects, and advantages, reference may be had to the following description of several fly swatters which embody the features of the invention when taken together with the drawings wherein:

FIG. 1 is a perspective illustration showing a fly swatter which embodies the features of my invention.

FIG. 2 is a rear view of the fly swatter in FIG. 1.

FIG. 3 is a section 3—3 of FIG. 2.

FIGS. 4, 5 and 6 are schematic illustrations wherein the structure has its elements joined in by means other than shown in FIG. 3.

Referring to FIGS. 1 and 2, the structure when viewed from the correct angle is comprised basically of what may be considered an artificial flower F having a leaved stem S and a petal head H. Hidden by the head, and supporting the head relative to the stem, is a flat, widened perforated swatter element E which is integral with the stem S. The entire assembly is made of a flexible plastic such as polyethylene, although a wire rod (not shown) is coaxially inserted into the stem S and lends extra rigidity thereto.

It will be understood that the terms stem, flower, petals, leaves and other terms indicating natural members, when used throughout this specification, refer to those artificial plastic parts which represent the natural parts denoted by the terms.

The stem S thickens at its lower end to form a handle N for convenient grasping by a hand, and supports decorative leaves 10. In the preferred embodiment of this invention, the leaves 10 are individually removable or removable in clusters at their respective stalks or the cluster stalks 12 by snap couplings not shown. The stalks are provided with axial coupling recesses which are narrower at the stalk end than in the interior and which receive coupling projection increasing in dimension as they extend upwardly and outwardly from the stem. The recesses and projections are dimensioned to form a convenient snap fit, it being understood that the plastic of which the leaves 10 and the stem S are composed is sufficiently resilient to provide such snap fit.

The swatter element E is provided with perforations P, an upper one of which, designated 14, is sufficiently large to receive a hanging hook or the like. By use of perforation 14, the entire structure may be conveniently hung on a wall with the swatter element E facing the wall and the head H directed outwardly. The head H, being larger than the element E, serves to obscure the latter so that the structure may hang on a wall and pass for a decorative device gracing the appearance of a household or the like.

The head H is comprised of a plurality of clover-like, flat, overlying, plastic petal sheets 18 joined at their centers to each other and to the center of the swatter element E. The sheets are colored to simulate a flower such as a rose and include a plurality of radially directed petals 20 which are rolled away from the swatter element E to simulate a flower head. The curvature away from the swatter element E should be sufficient to allow easy passage of air through the perforations P thereby preventing undesirable excess air disturbance when the swatter is used as such. Other elements of the flower, such as the calyx, the carralla and the like may also be represented by securing plastic formations thereof at their centers to the other elements or sheets and also to the swatter element.

Each of the flower elements is represented for convenience in the form of a curved or rolled sheet having edges to simulate the radially extending elements, and an opening in the center. Thus, four or five petals 20 may project radially from a center area to form a single petal sheet 18 having a center hole. These sheets overlay each other coaxially. Where suitable, if large center areas of the sheet are not visible in the final structure some of the center area around the center holes may be cut out to save material and weight.

FIG. 3 illustrates the preferred means for holding together the flower head. In this case, the swatter element E includes a solid portion 22 defining an annular step 24 which is coaxially aligned with the center holes 26 of the petal sheets. The step 24 separates two bores 28 and 30, the smaller of which 28 has a diameter equal to the diameter of the holes 26. A stepped plug having a cap 32 and a cylindrical shaft 34 is seated in the step 24 so that an annular cap surface 36 forming the cap 32 is seated against the step 24. The cap is dimensional so that the cap-top surface 38 is pressed flush with the surface of the swatter element E. The shaft 34 passes through the surface 28, the holes 26 of the petals, and terminates in an axial interior, projection-receiving snap-fit bore or recess 40. A mushroom-shaped flower stamens 42 terminates at its narrow end 44 in a snap-fit projection 46 which fits into the bore 40. The plug is dimensioned to provide a resilient press-fit relative to the openings through which it passes.

It will be seen that the embodiment shown provides a fly swatter which may be hung on a wall through its enlarged perforation 14 to present the appearance of an artificial flower. When its use is necessary it may be grasped by the thickened lower end of the stem S and swung toward a fly or other insect. The perforations provide the typical swatter action preventing an air disturbance which would otherwise merely brush the fly away.

Other embodiments of the invention, wherein the single stem supports the flower head as well as the swatter element are schematically illustrated in FIGS. 4 to 6. In these figures the structure is identical to that of FIG. 3 except as described below, and similar reference numerals are used for similar parts, but with individual identifying subscripts.

In FIG. 4, instead of the stem $S_1$ being an integral unit with the element $E_1$, the stem $S_1$ ends at its top in a flat flange 50 which is contiguously secured to the swatter element $E_1$ on one side and the flower head $H_1$ on the other side by the central securing means $34_1$.

In FIG. 5 the stem $S_2$ is an integral part of the flower head $H_2$, the swatter element $E_2$ being secured to the head $H_2$ by the central securing means $34_2$ and being secured to the stem $S_2$ at a point 52 below the juncture of head $H_2$ and stem $S_2$.

FIG. 6 schematically illustrates still another embodiment of the invention wherein the stem $S_3$ is forked to separately support the head $H_3$ and the swatter element $E_3$, the swatter element $E_3$ being integral with the stem $S_3$ and the head $H_3$ being mounted on flange 54, also integral with stem $S_3$, by the central securing means $34_3$.

While various embodiments of my invention have been described, it will be understood that the invention is not limited thereto for changes within the scope of my invention will be obvious to those skilled in the art.

I claim:

1. A fly swatter comprising a flat, wide, flexible swatter element having two faces, a handle connected thereto and extending therefrom, and a three-dimensional body formed independently of said swatter element, substantially centrally operatively connected to said swatter element, overlying one face of said swatter element with those portions thereof extending out from its center being unsecured to said one face of said swatter element, and of at least substantially the same areal extent as said swatter element so as to substantially obscure the latter, the other face of said swatter element being exposed for swatting purposes, said three-dimensional body simulating a vegetable growth and said handle simulating a vegetable stem.

2. The fly swatter of claim 1, in which said swatter element is perforated beneath at least some of said outwardly extending portions of said three-dimensional body, said portions being spaced from said one face of said swatter element.

3. The fly swatter of claim 1, in which said swatter element is perforated beneath at least some of said outwardly extending portions of said three-dimensional body, said portions being flexible and spaced from said one face of said swatter element.

4. The fly swatter of claim 1, in which said swatter element and handle are integral with one another, said three-dimensional body being a separate element secured directly to said swatter element.

5. The fly swatter of claim 4, in which said swatter element is perforated beneath at least some of said outwardly extending portions of said three-dimensional body, said portions being spaced from said one face of said swatter element.

6. The fly swatter of claim 4, in which said swatter element is perforated beneath at least some of said outwardly extending portions of said three-dimensional body, said portions being flexible and spaced from said one face of said swatter element.

References Cited in the file of this patent

UNITED STATES PATENTS

| D. 95,346 | Hawkey | Apr. 23, 1935 |
| D. 101,647 | Murray | Oct. 20, 1936 |
| D. 110,539 | Fingerhut | July 19, 1938 |
| 1,730,628 | Rogers | Oct. 8, 1929 |
| 1,882,291 | Monroe | Oct. 11, 1932 |
| 2,736,129 | Roop | Feb. 28, 1956 |